United States Patent
Forbert et al.

(10) Patent No.: US 10,707,479 B2
(45) Date of Patent: Jul. 7, 2020

(54) LITHIUM TRANSITION METAL PHOSPHATE SECONDARY AGGLOMERATES AND PROCESS FOR ITS MANUFACTURE

(71) Applicant: JOHNSON MATTHEY PUBLIC LIMITED COMPANY, London (GB)

(72) Inventors: Rainald Forbert, Moosburg (DE); Gerhard Nuspl, Munich (DE); Nicolas Tran, Nandlstadt (DE); Guoxian Liang, Saint-Hyacinthe (CA)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/777,120

(22) PCT Filed: Mar. 14, 2014

(86) PCT No.: PCT/EP2014/055187
§ 371 (c)(1),
(2) Date: Sep. 15, 2015

(87) PCT Pub. No.: WO2014/140326
PCT Pub. Date: Sep. 18, 2014

(65) Prior Publication Data
US 2016/0036042 A1    Feb. 4, 2016

(30) Foreign Application Priority Data
Mar. 15, 2013 (EP) .................................. 13159637

(51) Int. Cl.
*H01M 4/136* (2010.01)
*H01M 4/1397* (2010.01)
(Continued)

(52) U.S. Cl.
CPC ............. *H01M 4/136* (2013.01); *B82Y 30/00* (2013.01); *C01B 25/45* (2013.01);
(Continued)

(58) Field of Classification Search
CPC .. H01M 4/5825; H01M 4/136; H01M 4/1397; H01M 4/364; H01M 4/0471;
(Continued)

(56) References Cited

U.S. PATENT DOCUMENTS 8,053,075 B2    11/2011    Schall et al.
8,168,150 B2     5/2012    Hemmer et al.
(Continued)

FOREIGN PATENT DOCUMENTS

CN    101064367 A    10/2007
CN    102299336 A    12/2011
(Continued)

OTHER PUBLICATIONS

Herle et al., "Nano-network electronic conduction in iron and nickel olivine phosphates," Nature Materials, vol. 3, Mar. 2004, pp. 147-152.
(Continued)

*Primary Examiner* — Milton I Cano
*Assistant Examiner* — Philip A. Stuckey
(74) *Attorney, Agent, or Firm* — BakerHostetler

(57) ABSTRACT

A Lithium-transition-metal-phosphate compound of formula $Li_{0.9+x}Fe_{1-y}M_yPO_4$) in the form of secondary particles made of agglomerates of spherical primary particles wherein the primary particles have a size in the range of 0.02-2 pm and the secondary particles a mean size in the range of 10-40 pm and a BET surface of 16-40 $m^2/g$, a process for its manufacture and the use thereof.

10 Claims, 9 Drawing Sheets

(51) Int. Cl.

| | | |
|---|---|---|
| *C01B 25/45* | (2006.01) | |
| *H01M 4/58* | (2010.01) | |
| *B82Y 30/00* | (2011.01) | |
| *H01M 4/36* | (2006.01) | |
| *H01M 10/052* | (2010.01) | |
| *H01M 4/587* | (2010.01) | |
| *H01M 4/62* | (2006.01) | |
| *H01M 4/04* | (2006.01) | |
| *H01M 4/02* | (2006.01) | |

(52) U.S. Cl.
CPC ......... *H01M 4/1397* (2013.01); *H01M 4/364* (2013.01); *H01M 4/5825* (2013.01); *C01P 2002/50* (2013.01); *C01P 2002/52* (2013.01); *C01P 2004/03* (2013.01); *C01P 2004/32* (2013.01); *C01P 2004/50* (2013.01); *C01P 2004/51* (2013.01); *C01P 2004/61* (2013.01); *C01P 2004/62* (2013.01); *C01P 2004/64* (2013.01); *C01P 2006/11* (2013.01); *C01P 2006/12* (2013.01); *C01P 2006/40* (2013.01); *H01M 4/0471* (2013.01); *H01M 4/587* (2013.01); *H01M 4/625* (2013.01); *H01M 10/052* (2013.01); *H01M 2004/028* (2013.01)

(58) Field of Classification Search
CPC .... H01M 4/625; H01M 4/587; H01M 10/052; H01M 2004/028; B82Y 30/00; C01B 25/45; C01B 2004/028; C01B 4/0471; C01B 4/587; C01B 4/625; C01B 10/052; C01P 2004/64; C01P 2004/62; C01P 2004/61; C01P 2004/51; C01P 2006/40; C01P 2004/32; C01P 2004/03; C01P 2002/52; C01P 2002/50; C01P 2006/12; C01P 2006/11; C01P 2004/50
See application file for complete search history.

(56) References Cited

U.S. PATENT DOCUMENTS

| | | | |
|---|---|---|---|
| 9,216,907 | B2 | 12/2015 | Nakano et al. |
| 2010/0233540 | A1 | 9/2010 | Choy et al. |
| 2011/0017947 | A1 | 1/2011 | Nuspl et al. |
| 2011/0287315 | A1 | 11/2011 | Choy et al. |
| 2012/0003540 | A1 | 1/2012 | Nakano et al. |
| 2012/0237425 | A1 | 9/2012 | Nishio et al. |
| 2012/0270101 | A1 | 10/2012 | Higashizaki et al. |
| 2012/0328774 | A1* | 12/2012 | Liang .......... H01M 4/366 427/122 |
| 2013/0260245 | A1* | 10/2013 | Kitagawa ...... H01M 4/625 429/220 |

FOREIGN PATENT DOCUMENTS

| | | |
|---|---|---|
| CN | 102356488 A | 2/2012 |
| EP | 1850409 A1 | 10/2007 |
| EP | 2 413 402 A1 | 2/2012 |
| EP | 2 562 856 A2 | 2/2013 |
| JP | 2002-151082 A | 5/2002 |
| JP | 2010251302 A | 11/2010 |
| JP | 2011517653 A | 6/2011 |
| JP | 2011132095 A | 7/2011 |
| JP | 201212279 | 1/2012 |
| JP | 2012503632 A | 2/2012 |
| JP | 2012506362 A | 3/2012 |
| JP | 2013032257 A | 2/2013 |
| WO | 02/083555 A2 | 10/2002 |
| WO | 2005/051840 A1 | 6/2005 |
| WO | 2009/009758 A2 | 1/2009 |
| WO | 2009/127672 A1 | 10/2009 |
| WO | WO2011052533 A1 | 5/2011 |
| WO | WO-2012081383 A1 * | 6/2012 ............ H01M 4/625 |

OTHER PUBLICATIONS

Losey et al., "Structural Variation in the Lithiophilite-Triphylite Series and Other Olivine-Group Structures," The Canadian Mineralogist, vol. 42, pp. 1105-1115, 2004.
Morgan et al., "Li Conductivity in LixMPO4 (M=Mn, Fe, Co, Ni) Olivine Materials," Electrochemical and Solid-State Letters, vol. 7, No. 2, pp. A30-A32, 2004.
Padhi et al., "Phospho-olivines as Positive-Electrode Materials for Rechargeable Lithium Batteries," J. Electrochem. soc., vol. 144, No. 4, Apr. 1997, pp. 1188-1194.
Ravet et al., "Improved Iron Based Cathode Material," 196th Meeting of the Electrochemical Society, Oct. 1999, Abstract No. 127.
Yamada et al., "Reaction Mechanism of the Olivine-Type Lix(Mn0.6Fe0.4)PO4 ($0 \leq x \leq 1$)," Journal of the Electrochemical Society, vol. 148, No. 7, pp. A747-A754, 2001.
Yamada et al., "Crystal Chemistry of the Olivine-Type Li(MnyFe1-y)PO4 and (MnyFe1-y)PO4 as Possible 4 V Cathode Materials for Lithium Batteries," Journal of the Electrochemical Society, vol. 148, No. 8, pp. A960-A967, 2001.
Yamada et al., "Phase Diagram of Lix(MnyFe1-y)PO4 ($0 \leq x \leq 1$)," Journal of the Electrochemical Society, vol. 148, No. 10, pp. A1153-A1158, 2001.
Yamada et al., "Electrochemical, Magnetic, and Structural Investigation of the Lix(MnyFe1-y)PO4 Olivine Phases," Chem. Mater., 2006, pp. 804-813.
Chinese Office Action dated Sep. 2, 2016, in corresponding Chinese priority application, English translation provided.
Chinese Search Report dated Sep. 2, 2016, in corresponding Chinese priority application, English translation provided.
International Search Report, dated Apr. 23, 2014, from corresponding PCT Application.
English Translation of Japanese Patent Application No. 2015-562240: Notice dated Mar. 24, 2017, 1 page.
English Translation of Japanese Patent Application No. 2015-562240: Submission of Publications dated Mar. 24, 2017, 12 Pages.

* cited by examiner

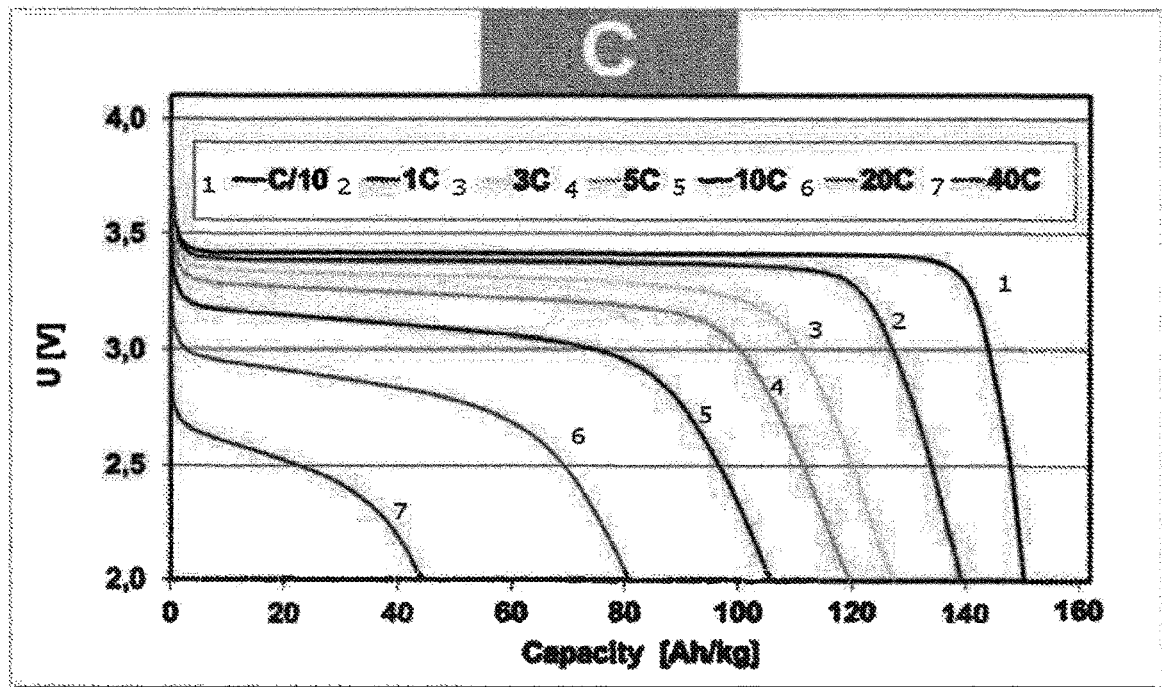
FIGURE 8C
Figure 9
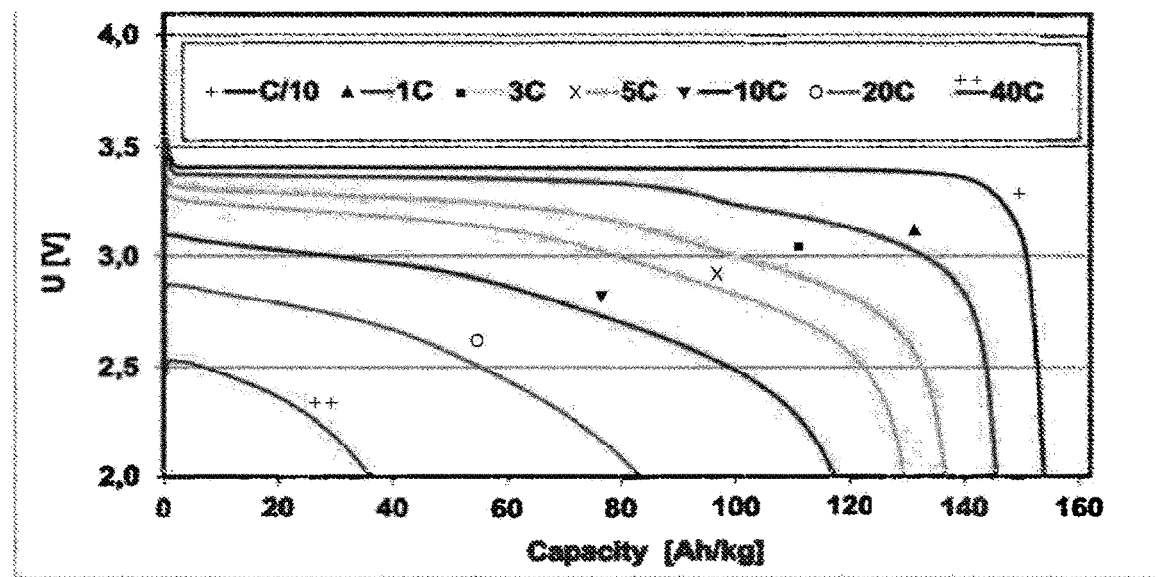

LITHIUM TRANSITION METAL PHOSPHATE SECONDARY AGGLOMERATES AND PROCESS FOR ITS MANUFACTURE

BACKGROUND OF THE INVENTION

Field of the Invention

The present invention relates to a lithium transition metal phosphate compound of formula $Li_{0.9+x}Fe_{1-y}M_y(PO_4)$ in the form of secondary particles made of spherical primary particles, a process for its manufacture and its use as active material in electrodes for secondary lithium-ion-batteries.

Description of the Related Art

Rechargeable lithium ion batteries have been widely used in the past and in the presence as power sources in a wide range of applications such as mobile phones, laptop computers, digital cameras, electrical vehicles and home appliances. In rechargeable lithium ion batteries, cathode materials are one of the key components and mainly devoted to the performance of the batteries. Since the pioneering work of Goodenough et al. (Padhi, Goodenough et al, J. Electrochem. Soc. 1997, 144, 1188) $LiMPO_4$ compounds with M=Fe, Mn, Ni and Co with an ordered olivine-type structure have attracted an extensive attention due to their high theoretical specific capacity of around 170 $mAhg^{-1}$.

$LiMPO_4$ compounds adopt an olivine related structure which consists of hexagonal closed packing of oxygen atoms with $Li^+$ and $M^{2+}$ cations located in half of the octahedral sides and $P^{5+}$ cations in ⅛ of tetrahedral sides. This structure may be described as chains along the c direction of edge sharing $MO_6$ octahedra that are cross-linked by the $PO_4$ groups forming a three-dimensional network. Tunnels perpendicular to the [010] and [001] directions contain octahedrally coordinated $Li^+$ cations along the b-axis which are mobile in these cavities. Among these phosphates, $LiFePO_4$ is the most attractive, because of its high stability, low cost and high compatibility with environments.

However, it is difficult to attain the full capacity because electronic conductivities are very low, which leads to initial capacity loss and poor rate capability and diffusion of $Li^+$ ion across the $LiFePO_4/FePO_4$ boundary is slow due its intrinsic character. The pure electrical performance of $LiFePO_4$ cathode material has also attracted interest among many researches.

It was found that for $LiFePO_4$ and related compounds small particle size and well shaped crystals are important for enhancing the electrochemical properties. In particles with a small diameter the Li-ions may diffuse over smaller distances between the surfaces and center during Li-intercalation and de-intercalation and $LiMPO_4$ on the particle surface contributes mostly to the charge/discharge reaction.

Substitution of $Li^+$ or $Fe^{2+}$ with cations is a further way to attain full capacity as described for example by Yamada et al. J. Electrochem. Soc. 2001, 148, A960, A1153, A747 which reported the preparation of Mn-doped $LiMn_{0.6}Fe_{0.4}PO_4$. Further, doped $LiZn_{0.01}Fe_{0.99}PO_4$ was also proposed. Also doping with cobalt, titanium, vanadium and molybdenum, chromium and magnesium is known. Herle et al. in Nature Materials, Vol. 3, pp. 147-151 (2004) describe lithium-iron and lithium-nickel phosphates doped with zirconium. Morgan et al. describes in Electrochem. Solid State Lett. 7 (2), A30-A32 (2004) the intrinsic lithium-ion conductivity in $Li_xMPO_4$ (M=Mn, Fe, Co, Ni) olivines. Yamada et al. in Chem. Mater. 18, pp. 804-813, 2004 deal with the electrochemical, magnetic and structural features of $Li_x(Mn_yFe_{1-y})PO_4$, which are also disclosed e.g. in WO2009/009758. Structural variations of $Li_x(Mn_yFe_{1-y})PO_4$, i.e. of the lithiophilite-triphylite series, were described by Losey et al. The Canadian Mineralogist, Vol. 42, pp. 1105-1115 (2004).

Ravet et al. (Proceedings of 196th ECS meeting 1999, 99-102) showed that carbon coated $LiFePO_4$ with 1 wt.-% carbon content can deliver a discharge capacity of 160 $mAh/g^{-1}$ at 80° C. at a discharge rate of C/10 using a polymer electrolyte.

Various approaches for preparing carbon composites and carbon coated $LiMPO_4$ materials have been published so far.

As discussed in the foregoing, the morphology of the particles of $LiMPO_4$ compounds is one of the essential key factors for obtaining high charge and discharge capacities and the full theoretical capacity. However, synthesis of these compounds especially via wet chemistry methods or hydrothermal methods yields materials with large primary particles causing a negative impact such as a relatively low capacity of the related lithium cells.

The main disadvantages of powders comprising smaller particles are a very small bulk and tap density and a different processing compared to compounds with larger particle sizes.

EP 2 413 402 A1 discloses a process for the preparation of lithium iron phosphate wherein a mixture of hydrothermally prepared $LiFePO_4$ and polyethylene glycol is wet-milled, the milled product dried and spray milled.

US 2010/0233540 A1 describes secondary agglomerates of primary particles of a lithium iron phosphate with an olivine type structure with an average particle diameter of the secondary agglomerates of 5 to 100 μm and with a porosity of 50-40% consisting of primary particles of 50-550 nm represented by the formula $Li_{1+A}Fe_{1-x}M_x(PO_{4-b})X_b$. The primary particles are synthesized under super critical hydrothermal conditions. The secondary agglomerates according to US 2010/0233540 A1 are obtained by a spray drying and have a spherical form and the BET-surface of these secondary agglomerates is 5-15 $m^2/g$.

The disadvantages of the process as described in US 2010/0233540 A1 is the energy consumption during the drying of the slurries which have a solid content of only 5-20%. The duration of the pyrolysis of the secondary agglomerates after spray drying is 10 hours and longer which also generates increased energy costs.

SUMMARY OF THE INVENTION

It was therefore an object of the present invention to provide lithium transition metal phosphates in particle form comprising primary and secondary particles, whereas the secondary particles are consisting of agglomerated primary particles with or without carbon coating and which provide a high bulk and tap density, therefore providing increased electrode density and hence the energy density of the battery when the lithium transition metal phosphate according to the present invention is used as the active electrode material.

This object is achieved by a lithium-transition-metal-phosphate of formula $Li_{0.9+x}Fe_{1-y}M_y(PO_4)$ in the form of secondary particles made of agglomerates of spherical primary particles wherein the primary particles have a size in the range of 0.02-2 μm, more preferably in the range of 0.02-0.95 μm or in other embodiments 0.7-0.95 μm and the secondary particles have a mean size ($d_{50}$) in the range of 5-40 µm and a BET surface of 16-40 m$^2$/g. x is a number 0.3 and 0≤y≤1.

Surprisingly it was found that the lithium-transition-metal-phosphates according to the invention when used as active material in electrodes for secondary lithium ion batteries display a high electrical conductivity and an improved electric capacity as well as improved rate characteristics compared to batteries with electrodes having an active material of the prior art.

The lithium-transition-metal-phosphate according to the invention may be doped or non-doped.

Therefore, the term "a or the lithium-transition-metal-phosphate" means within the scope of this invention both a doped or non-doped lithium-transition-metal-phosphate as is also expressed by the stoichiometric chemical formula $Li_{0.9+x}Fe_{1-y}M_y(PO_4)$. Lithium may be present in slightly understoichiometric amounts (x<0.1), in exactly stoichiometric (x=0.1) amounts or in excess stoichiometry (overstoichiometric 0.1<x≤0.3).

"Non-doped" means pure, in particular phase-pure lithium-transition-metal-phosphate having the formula $Li_{0.9+x}Fe_{1-y}M_y(PO_4)$ wherein x has the same meaning as above and y is 0. Non-limiting representative examples for such compounds according to the invention are $LiFePO_4$, $LiMnPO_4$, $LiCoPO_4$, $LiNiPO_4$, $LiRuPO_4$ and the like, specifically $LiFePO_4$ and $LiMnPO_4$ and $LiCoPO_4$.

A "doped" lithium transition metal phosphate means a compound of the formula $Li_{0.9+x}Fe_{1-y}M_yPO_4$ wherein x has the same meaning as above and y is >0, that is, an additional metal (including transition metals) or semimetal M is present.

As recited above in further specific embodiments of the invention M may be selected from the group consisting of metals and semimetals like Co, Ni, Al, Mg, Sn, Pb, Nb, B, Cu, Cr, Mo, Ru, V, Ga, Si, Sb, Ca, Sr, Ba, Ti, Zr, Cd, Mn and mixtures thereof. Preferably M represents Co, Mn, Mg, Nb, Ni, Al, Zn, Ca, Sb and mixtures thereof and y is in a range of ≤0.5 and ≥0.001.

Exemplary non limiting compounds according to the invention are $Li_{0.9+x}Fe_{1-y}Mg_y(PO_4)$ $Li_{0.9+x}Fe_{1-y}Nb_y(PO_4)$, $Li_{0.9+x}Fe_{1-y}Co_y(PO_4)$ $Li_{0.9+x}Fe_{1-y}Zn_y(PO_4)$, $Li_{0.9+x}Fe_{1-y}Al_y(PO_4)$ $Li_{0.9+x}Fe_{1-y}(Zn, mg)_y(PO_4)$ $Li_{0.9+x}Fe_{1-y}Mn_y(PO_4)$ with x and y having the same meanings as recited above with the values for y as defined in the foregoing paragraph.

In other embodiments of the invention, M is Mn, Co, Zn, Mg, Ca, Al or combinations thereof, in particular Mn, Mg and/or Zn. It has been surprisingly found that the electrochemically inactive dopants Mg, Zn, Al, Ca, in particular Mg and Zn provide materials with particularly high energy density and capacity when they are used as electrode materials.

The substitution (or doping) by these metal cations that are in themselves electrochemically inactive seems to provide the very best results at values of y=0.03-0.15, preferably 0.05-0.08, in particular 0.05±0.01 with regard to energy density and capacity of the lithium-transition-metal-phosphate according to the invention.

It was found that for compounds according to the invention such as $Li_{0.9}Fe_{0.90}Zn_{0.10}(PO_4)$, $Li_{0.95}Fe_{0.90}Zn_{0.10}(PO_4)$ and $Li_{0.95}Fe_{0.93}Zn_{0.07}(PO_4)$ and $LiFe_{0.90}Zn_{0.10}(PO_4)$ the 3.5 V plateau is longer than for $Li_{0.95}FePO_4$, $LiFePO_4$ or $Li_{0.90}FePO_4$ and the specific capacity is higher, which means an increase in energy density.

In specific embodiments of the present invention, the BET surface is in the range of 16-40 m$^2$/g, in other embodiments 16-30 m$^2$/g.

In another embodiment of the invention, the secondary agglomerates have a porosity. Specifically their bulk porosity is in the range of 65-80%.

In one further embodiment, the lithium transition metal phosphates according to the invention have an excellent tap porosity in the range of 55-65%.

The lithium transition metal phosphate according to the invention display also excellent bulk, tap and press densities (the latter especially when used as the single or one of the active materials in a cathode) compared to prior art materials. Their bulk density is in the range of 750-1250 g/l. Their tap density is in the range of 1250-1600 g/l. Further the lithium transition metal phosphate according to the invention have an excellent press density in the range of 2000-2800 g/l.

A higher bulk density allows for better and easier processability, especially provides higher filling degree of the machines for preparing the slurries for the electrode formulation increasing the through-put during electrode manufacture.

In a specific embodiment, the lithium transition metal phosphate according to the invention is $LiFePO_4$ or $LiMnPO_4$. In still another specific embodiment, the lithium transition metal phosphate according to the invention is $LiFe_{1-y}Mn_yPO_4$.

In still further embodiments, the lithium-transition-metal-phosphate comprises carbon.

The carbon is particularly preferably evenly distributed throughout the lithium-transition-metal-phosphate. In other words, the carbon forms a type of matrix in which the lithium-transition-metal-phosphate according to the invention is embedded. It makes no difference for the meaning of the term "matrix" used herein whether e.g. the carbon particles serve as "nucleation sites" for the $Li_{0.9+x}Fe_{1-y}M_y(PO_4)$ particles according to the invention, i.e. whether these nucleate on the carbon, or whether, as in a particularly preferred development of the present invention, the individual particles of the lithium-iron metal phosphate $Li_{0.9+x}Fe_{1-y}M_y(PO_4)$ are covered in carbon, i.e. sheathed or in other words at least partially coated. More specifically, the primary particles of the lithium transition metal phosphate according to the invention have a conductive carbon deposit on at least a part of the surface of the primary particles. Both variants are considered as equivalent according to the invention and fall under the above definition as "comprising carbon".

Important for the purpose of the present invention is merely that the carbon is evenly distributed in the entirety of the (primary and secondary) particles of the lithium-transition-metal-phosphate $Li_{0.9+x}Fe_{1-y}M_y(PO_4)$ according to the invention and forms a type of (three-dimensional) matrix. In embodiments of the present invention, the presence of carbon or a carbon matrix may make obsolete the further addition of electrically conductive additives such as e.g. conductive carbon black, graphite etc. when using the $Li_{0.9+x}Fe_{1-y}M_y(PO_4)$ according to the invention as electrode material.

In a further embodiment of the invention, the proportion of carbon relative to the lithium-transition-metal phosphate is ≤4 wt.-%, in further embodiments ≤2.5 wt.-%, in still further embodiments ≤2.2 wt.-% and in still further embodiments ≤2.0 wt.-% or ≤1.5 wt.-%. Thus the best energy densities of the material according to the invention are achieved.

The object of the present invention is further achieved by an electrode, more specifically by a cathode for a lithium secondary battery comprising as active material a lithium transition metal phosphate according to the invention.

Typical further constituents of an electrode according to the invention (or in the so-called electrode formulation) are, in addition to the active material, also conductive carbon blacks as well as a binder. According to the invention, however, it is even possible to obtain a usable electrode with active material containing or consisting of the lithium-transition-metal-phosphate according to the invention without further added conductive agent (i.e. e.g. conductive carbon black).

Any binder known per se to a person skilled in the art can be used as binder, such as for example polytetrafluoroethylene (PTFE), polyvinylidene difluoride (PVDF), polyvinylidene difluoride hexafluoropropylene copolymers (PVDF-HFP), ethylene-propylene-diene terpolymers (EPDM), tetrafluoroethylene hexafluoropropylene copolymers, polyethylene oxides (PEO), polyacrylonitriles (PAN), polyacryl methacrylates (PMMA), carboxymethylcelluloses (CMC), and derivatives and mixtures thereof.

Typical proportions of the individual constituents of the electrode material are preferably 90 parts by weight active material, e.g. of the lithium transition metal phosphate according to the invention, 5 parts by weight conductive carbon and 5 parts by weight binder. A different formulation likewise advantageous within the scope of the present invention consists of 90-96 parts by weight active material and 4-10 parts by weight conductive carbon and binder.

The object is further achieved by a secondary lithium secondary battery comprising a cathode according to the present invention.

In further embodiments of the present invention, the secondary lithium-ion battery according to the invention has a exemplary (but not limiting) cathode/anode pairs $LiFePO_4//Li_4Ti_5O_{12}$ with a single cell voltage of approx. 2.0 V, which is well suited as substitute for lead-acid cells or $LiCo_zMn_yFe_xPO_4//Li_4Ti_5O_{12}$ with increased cell voltage and improved energy density.

A still further object of the invention was to provide a process for the synthesis of lithium transition metal phosphates according to the invention.

Accordingly the process for the synthesis of a lithium transition metal phosphate according to the invention comprises the following steps of:
a) providing $Li_{0.9+x}Fe_{1-y}M_yPO_4$ in particle form,
b) preparing an aqueous suspension and—optionally—adding a carbon precursor compound
c) subjecting the aqueous suspension to a milling treatment, wherein the milling energy introduced into the suspension is set to a value between 800-2500 kWh/t,
d) spray-drying of the milled suspension to obtain secondary agglomerates of $Li_{0.9+x}Fe_{1-y}M_yPO_4$,
e) heat treatment of the secondary agglomerates.

Optionally one or two particle classifying process steps can be added after spray drying, e.g. screening, sifting or sieving. In particular a sieving and/or sifting step may be carried out with a nominal mesh size of 33 µm to 40 µm.

The process according to the invention provides in one embodiment therefore $Li_{0.9+x}Fe_{1-y}M_yPO_4$ in the form of secondary agglomerates with the properties as described above and in another specific embodiment also $Li_{0.9+x}Fe_{1-y}M_yPO_4$ comprising carbon in the sense as discussed beforehand. The particle size distribution of the so obtained product has a value for $d_{50}$ of 5-25 µm, in other embodiments 10-20 µm, preferably 15-20 µm.

The milling treatment in step c) before subjecting the suspension to spray drying yields surprisingly $Li_{0.9+x}Fe_{1-y}M_yPO_4$ in the form of secondary agglomerates which does not have the disadvantages of the $Li_{0.9+x}Fe_{1-y}M_yPO_4$ in the form of secondary agglomerates in the prior art. The milling provides extremely fine primary particles, regardless how the initial particles have been synthesized which have a spherical "ball-like" form in contrast to e.g. hydrothermally synthesized primary particles which are in the form of needles or platelets, as for example the primary particles of US 2010/0233540 A1 or U.S. Pat. No. 8,053,075 B2. The secondary particles have a BET-surface of 16-40 $m^2$/g, in other embodiments 16-30 $m^2$/g. After spray drying, the product according to the invention, i.e. the $Li_{0.9+x}Fe_{1-y}M_yPO_4$ in the form of secondary agglomerates (with or without carbon) has a high packing density of the secondary agglomerates which in turns provides a high bulk and tap density.

Without being bound by theory it appears that the milling step yields a material with increased capacity and rate characteristics when used as electrode active material in secondary lithium ion batteries.

$Li_{0.9+x}Fe_{1-y}M_yPO_4$ in particle form, i.e. the primary particles, can be synthesized by a variety of synthetic pathways, like for example via solid-state reactions, co-precipitation, a hydrothermal method or by a so-called supercritical hydrothermal method and is for the purpose of the present invention not limited to a specific synthetic pathway.

In this specific embodiment of the process according to the invention, a carbon precursor compound, in other words a carbon-containing material is added during step b. This can be either pure carbon, such as e.g. graphite, acetylene black or Ketjen black, or a carbon-containing precursor compound which then decomposes when exposed to the heat treatment in step e) to a carbonaceous residue. Representative non limiting examples of such a carbon containing compound are e.g. starch, maltodextrin, gelatine, a polyol, a sugar such as mannose, fructose, sucrose, lactose, glucose, galactose, a partially water-soluble polymer such as e.g. a polyacrylate, etc. and mixtures thereof.

In a further embodiment of the process according to the invention, an additional water soluble binder is added in step b). In still a further embodiment of the process according to the invention an additional dispersion agent is also added in step b).

As a binder, a carbon containing compound which additionally contains only hydrogen and oxygen and pyrolyzes by applying a heat treatment to elemental carbon is preferred. Especially preferred is lactose since the use of lactose increases the fluidity (and thus the handling) of the suspension in the further process steps, especially during spray-drying. Further binders useful for the purpose of the invention are for example hydroxypropylcellulose, polyvinylalcohol, polyethyleneglycol, polyethylenoxide, polyacrylates etc. It is also part of the invention to use more than one binder.

The dispersion agent is water soluble and should also contain only carbon, hydrogen and oxygen, i.e. should also carbonize under a heat treatment regime. As an especially preferred dispersion agent, solid organic acids can be used in the process according to the invention. These acids comprise but are not limited to citric acid, tartaric acid etc. Further dispersion agents useful for the purpose of the invention are for example maleic acid, ascorbic acid, oxalic acid, glycolic acid, 1,2,3,4 butanetetracarboxylic acid etc. and mixtures thereof. Part of the invention is the use of a combination of different dispersion agents, e.g. citric acid and glycolic acid.

It has been found that even tiny amounts of dispersion agent (or a mixture of dispersion agents) of 0.05 mass-%

(based on the mass of the lithium transition metal phosphate) are sufficient to obtain the desired product of the invention. The amount of dispersion agent is usually in the range of 0.05-2 mass-% (based on the mass of the lithium transition metal phosphate).

The suspension in step b) is preferably set to a pH value of between 6 and 8, preferably 7 by adding the acid dispersion agent.

The process according to the invention includes an optional pre-milling or dispergation treatment before step c).

The milling in step c) is carried out stepwise or continuously. Preferably the milling is carried out in a ball mill. The grinding beads have a diameter in the range of 50-200 µm, preferably in the range of 90-110 µm. The grinding beads consist of a material which does not contaminate the desired $Li_{0.9+x}Fe_{1-y}M_yPO_4$ according to the invention, i.e. a material which does not show abrasion and/or chemical reactivity. Preferably a non-metallic material is used (albeit stainless steel may also be used) as for example stabilized or non-stabilized zirconia or aluminum oxide. The milling compartment and the milling unit are also coated and/or protected by a protective layer to avoid contamination of the product by abrasion and/or a chemical reaction. Preferably, the coating/protective layer is made of or comprises polyurethane or a ceramic material, like zirconia, silicon nitride, silicon carbide, the latter being especially preferred.

In a further embodiment of the process according to the invention, a dispersion agent is added during the milling step c). The milling energy introduced into the suspension is set between 800-2500 kWh/t, preferably 1200-2000 kWh/t, in a specific embodiment 1200-1400 kWh/t while the reference mass (t) refers to the mass of the solids in the suspension. This energy generates heat so that the suspension has to be cooled by a suitable cooling device. Also during the milling step, further dispersion agent(s) can be added stepwise or continuously.

Surprisingly it was found that the BET surface of the products according to the invention is dependent on the milling energy introduced in the suspension in step c) of the process according to the invention.

In specific embodiments of the present invention, the BET surface is typically in the range of 16-30 m²/g. With a milling energy of 1200 kWh/t and grinding beads of 100 µm, $LiFePO_4$ with a BET surface of 19 m²/g was obtained after pyrolysis in a rotary kiln. In another example $C—LiFePO_4$ with a BET surface of 28 m²/g was obtained after pyrolysis in a stationary kiln.

A similar phenomenon can be observed for the bulk and tap porosity which also appear to be dependent upon the milling energy introduced in the suspension/slurry:

In a specific non-limiting embodiment, for $C—LiFePO_4$, according to invention, the following values can be found as shown in table 1 compared to a prior art $C—LiFePO_4$ synthesized according to US 2010/0233540 without a milling step before spray drying.

TABLE 1

Bulk and Tap Porosity vs. Milling Energy for $C—LiFePO_4$:

| Milling Energy | Bulk Porosity | Tap Porosity |
|---|---|---|
| Unmilled (prior art) | 85% | 75% |
| 1200 kWh/t | 72% | 58% |
| 1600 kWh/t | 70% | 56% |
| 2000 kWh/t | 68% | 55% |

Low porosities, i.e. higher bulk and tap densities hence increased electrode densities and capacities can be obtained by the material obtained by the process according to the invention compared to prior art materials and processes.

This can be clearly seen by comparing the figures, especially FIGS. 2 and 4, where the unmilled $C—LiFePO_4$ secondary agglomerates show clearly a higher porosity than the $C—LiFePO_4$ secondary agglomerates which have been subject to a milling step prior to spray drying, in the present example with a milling energy of 1200 kWh/t. This is due to the smaller primary particles.

After the milling step c) a further dispergation treatment can be carried out. This treatment may be performed by any commercially available dispersing equipment, e.g. a rotor/stator disperser or a colloid mill, can be useful for suspensions re-agglomerating before spray drying in order to prevent the atomizer from clogging and to decrease the viscosity of the suspension prior to atomization.

In a further embodiment of the process according to the invention, the spray-drying in the step d) is carried out at a temperature between 120-500° C. The spray drying can be carried out by any commercially available device for spray drying, e.g. a conventional co-current spray dryer. The atomization of the slurry is carried out with a rotary atomizer, a hydraulic nozzle, a pneumatic nozzle, a combined hydraulic and pneumatic nozzle with pressure on the slurry/suspension and a gaseous spraying medium, or a ultrasonic atomizer. Particularly preferred are a rotary atomizer or a pneumatic nozzle.

Another surprising feature of the process of the present invention is the high content of solids in the suspension/slurry used for spray drying compared to prior art processes like for example as described in US 2010/0233540 A1. In the present invention a very high solid content can be used, namely 20-70%, preferably 40-65% in other embodiments 45-55%.

The drying of the suspension/slurry is carried out at gas entry temperatures in the spray-drying apparatus of 120-500° C., usually between 200-370° C. The exit temperatures are in the range of 70-120° C. The separation of the solid product from the gas can be done with any commercially available gas-solid separation system, e.g. a cyclone, an electrostatic precipitator or a filter, preferably with a bag filter with a pulsed jet dedusting system.

The dried secondary agglomerates of $Li_{0.9+x}Fe_{1-y}M_yPO_4$ are then subjected to a heat treatment.

The heat treatment (step e) of the process according to the invention) is in one embodiment of the invention a pyrolysis which is carried out at a temperature of between 500° C. and 850° C., preferably between 600-800° C., especially preferred between 700-750° C. in a continuously operated rotary kiln. It is understood that any other suitable device can be used as well for the purpose of the present invention. At this temperature the carbon precursor compound present in one embodiment of the process according to the invention is pyrolyzed to carbon which then wholly or at least partly covers the $Li_{0.9+x}Fe_{1-y}M_y(PO_4)$ primary particles as a layer (coating). The pyrolysis is typically carried out over a period of ca. 1 h.

Nitrogen is used as protective gas during the pyrolysis for production engineering reasons, but all other known protective gases such as for example argon etc., as well as mixtures thereof, can also be used. Technical-grade nitrogen with low oxygen contents can equally also be used.

Optionally one or two particle classifying process steps can be added to remove either a coarse or a fine fraction of the secondary agglomerates or both. This can be done by any commercially available equipment for particle classifying e.g. a cyclone, an air classifier, a screen, a sieve, a sifter or a combination thereof. In one embodiment of the invention the heat treated secondary agglomerates of $Li_{1+x}Fe_{1-y}M_yPO_4$ are sieved on a tumbler screening machine with combined ultrasonic and air brush cleaning at a nominal mesh size of 33 µm to 40 µm, preferably 40 µm. The fine fraction is taken as the product the coarse fraction is then rejected.

BRIEF DESCRIPTION OF THE DRAWING FIGURES

The invention is further explained by way of Figures and exemplary embodiments which are by no means meant to be limiting the scope of the invention.

FIG. 1 is a SEM image of primary particles of unmilled C—LiFePO$_4$ obtained by a hydrothermal method, FIG. 2 is a SEM image of secondary agglomerates of unmilled C—LiFePO$_4$ obtained by spray drying without a milling step, FIG. 3 is a SEM image of the primary particles of the secondary agglomerates of C—LiFePO$_4$ of the invention milled with 1200 kWh/t, FIG. 4 is a SEM image of the secondary agglomerates of C—LiFePO$_4$ of the invention milled with 1200 kWh/t.

FIG. 5 shows unmilled carbon coated LiFePO$_4$ in powder form

FIG. 6 shows another SEM photograph of secondary particles of C—LiFePO$_4$ according to the invention FIG. 7 shows the capacity of an electrode with C—LiFePO$_4$ according to the invention as active material FIG. 8A, FIG. 8B and FIG. 8C show the capacity upon cycling of prior art C—LiFePO$_4$ agglomerates of three different sources as active material FIG. 9 shows the capacity upon cycling of (unmilled) C—LiFePO$_4$ agglomerates of prior art

DETAILED DESCRIPTION OF THE INVENTION

Experimental
1. General
Determination of the Particle-Size Distribution:

The particle-size distributions for the secondary agglomerates are determined using a light scattering method using commercially available devices. This method is known per se to a person skilled in the art, wherein reference is also made in particular to the disclosure in JP 2002-151082 and WO 02/083555. In this case, the particle-size distributions were determined by a laser diffraction measurement apparatus (Mastersizer 2000 APA 5005, Malvern Instruments GmbH, Herrenberg, Del.) and the manufacturer's software (version 5.40) with a Malvern dry powder feeder Scirocco ADA 2000. The setting of the refractive index of the material was 0.00 because the Fraunhofer data analysis method was used. The sample preparation and measurement took place according to the manufacturer's instructions. An air dispersion pressure of 0.2 bar was used.

The $D_{90}$ value gives the value at which 90% of the particles in the measured sample have a smaller or the same particle diameter according to the method of measurement. Analogously, the $D_{50}$ value and the $D_{10}$ value give the value at which 50% and 10% respectively of the particles in the measured sample have a smaller or the same particle diameter according to the method of measurement.

According to a particularly preferred embodiment of the invention, the values mentioned in the present description are valid for the $D_{10}$ values, $D_{50}$ values, the $D_{90}$ values as well as the difference between the $D_{90}$ and $D_{10}$ values relative to the volume proportion of the respective particles in the total volume. Accordingly, the $D_{10}$, $D_{50}$ and $D_{90}$ values mentioned herein give the values at which 10 volume-% and 50 volume-% and 90 volume-% respectively of the particles in the measured sample have a smaller or the same particle diameter. If these values are obtained, particularly advantageous materials are provided according to the invention and negative influences of relatively coarse particles (with relatively larger volume proportion) on the processability and the electrochemical product properties are avoided. Preferably, the values mentioned in the present description are valid for the $D_{10}$ values, the $D_{50}$ values, the $D_{90}$ values as well as the difference between the $D_{90}$ and the $D_{10}$ values relative to both percentage and volume percent of the particles.

For compositions (e.g. electrode materials) which, in addition to the lithium-transition-metal phosphates according to the invention contain further components, in particular for carbon-containing compositions and electrode formulations, the above light scattering method can lead to misleading interpretations as the lithium-transition-metal phosphates secondary agglomerates can form further and larger agglomerates within the dispersion. However, the secondary particle-size distribution of the material according to the invention can be directly determined as follows for such compositions using SEM photographs:

A small quantity of the powder sample is suspended in 3 ml acetone and dispersed with ultrasound for 30 seconds. Immediately thereafter, a few drops of the suspension are dropped onto a sample plate of a scanning electron microscope (SEM). The solids concentration of the suspension and the number of drops are measured so that a large single-ply layer of powder particles forms on the support in order to prevent the powder particles from obscuring one another. The drops must be added rapidly before the particles can separate by size as a result of sedimentation. After drying in air, the sample is placed in the measuring chamber of the SEM. In the present example, this is a LEO 1530 apparatus which is operated with a field emission electrode at 1.5 kV excitation voltage, an aperture of 30 µm, an SE2 detector, and 3-4 mm working distance. At least 20 random sectional magnifications of the sample with a magnification factor of 20,000 are photographed. These are each printed on a DIN A4 sheet together with the inserted magnification scale. On each of the at least 20 sheets, if possible at least 10 free visible particles of the material according to the invention, from which the powder particles are formed together with the carbon-containing material, are randomly selected, wherein the boundaries of the particles of the material according to the invention are defined by the absence of fixed, direct connecting bridges. On the other hand, bridges formed by carbon material are included in the particle boundary. Of each of these selected particles, those with the longest and shortest axis in the projection are measured in each case with a ruler and converted to the actual particle dimensions using the scale ratio. For each measured $Li_{0.9+x}Fe_{1-y}M_yPO_4$ particle, the arithmetic mean from the longest and the shortest axis is defined as particle diameter. The measured $Li_{0.9+x}Fe_{1-y}M_yPO_4$ particles are then divided analogously to the light-scattering method into size classes. The differential particle-size distribution relative to the volume of particles is obtained by plotting the volume of the associated particles in each case against the size class. The volume of the associated particles V is approximated by the sum of the spherical volumes of each of these n particles $V_i$ calculated from their corresponding particle diameters $d_i$:

$$V = \sum_{i=1}^{n} V_i = \frac{\pi}{6} \sum_{i=1}^{n} d_i^3$$

The cumulative particle-size distribution from which $D_{10}$, $D_{50}$ and $D_{90}$ can be read directly on the size axis is obtained by continually totaling the particle volumes from the small to the large particle classes.

The described process was also applied to battery electrodes containing the material according to the invention. In this case, however, instead of a powder sample a fresh cut or fracture surface of the electrode is secured to the sample holder and examined under a SEM.

BET measurements were carried out according to DIN-ISO 9277.

Bulk density was determined according to ISO 697 (formerly DIN 53912).

Tap density was measured according to ISO 787 (formerly DIN 53194).

Press density and Powder Resistivity were measured at the same time with a combination of a Lorenta-CP MCP-T610 and a Mitsubishi MCP-PD 51 device. The Powder Resistivity is calculated according to formula:

Powder resistivity [Ωcm]=resistance [Ω]×thickness [cm]×RCF (RCF=device dependent Resistivity Correction Factor)
Pressure density was calculated according to the formula $$\text{Pressure density [g/cm}^3\text{]} = \frac{\text{mass of sample [g]}}{\Pi \times r^2 \text{ [cm}^2\text{]} \times \text{thickness of the sample [cm]}}$$

The porosities were obtained from the corresponding measured densities according to the following formula:

$$\text{Porosity} = \frac{1 - \text{density}}{\text{true material density}}$$

(the true material density was determined according to ISO 1183-1). For pure $LiFePO_4$, the value is 3.56 kg/l.

The SEM images taken with the LEO 1530 apparatus were recorded in tif file format at a resolution of 1024×768. The mean primary particle diameter was measured as described in EP 2 413 402 A1 for FE-SEM images.

Spray drying was performed in a Nubilosa spray dryer 1.25 m in diameter, 2.5 m in cylindrical height and 3.8 m in total height. The spray dryer was equipped with pneumatic nozzles type 970 form 0 S3 with an open diameter of 1.2 mm and type 940-43 form 0 S2 with an open diameter of 1.8 mm both of Düsen-Schlick GmbH, Hutstraße 4, D-96253 Untersiemau, Germany. Drying gas was supplied by a controlled suction fan and heated electrically before entering the spray dryer. The dried particles were separated from the gas stream by a bag filter and recovered by a pulsed jet dedusting system. Amount of drying gas, gas inlet temperature and outlet temperature were controlled by a process control system. The outlet temperature control governed the speed of the slurry feed pump. Atomization gas was supplied by the compressed air distribution of the plant and its pressure was controlled by a local pressure controller.

Pyrolysis was performed in a rotary kiln type LK 900-200-1500-3 of HTM Reetz GmbH, Köpenicker Str. 325, D-12555 Berlin, Germany. Its heated rotary tube was 150 mm in diameter and 2.5 m in length. It provided a preheating zone, three heated separately controlled temperature zones, and a cooling zone. The inclination of the tube could be adjusted and its rotational speed was variably controlled. Product was supplied by a controlled screw feeder. Product supply, the kiln itself and product outlet could be blanketed by nitrogen. The amount of pyrolyzed product could be continuously monitored by a balance.

Milling was performed in an agitated ball mill MicroMedia™ P2 by Bühler AG, CH-9240 Uzwil, Switzerland, with SSiC ceramic cladding. It was filled with yttrium stabilized zirconium oxide beads of nominal 100 μm (80-130 μm) diameter. Its peripheral speed was controlled between 6.5 and 14.0 m/s. The milling compartment had a volume of 6.3 liter. The drive had a power rating of 30 kW. Heat was removed through the walls of its milling compartment by cooling water. The slurry to be milled was passed from an agitated vessel via a controlled peristaltic pump through the mill back to the vessel. This closed loop was operated until the desired specific milling energy had been reached.

2. Synthesis of the Primary Particles of Lithium Transition Metal Phosphates

The lithium transition metal phosphates, for example $LiFePO_4$, $LiCoPO_4$, $LiMnPO_4$, were obtained via hydrothermal synthesis according to WO2005/051840. The synthesis method can be applied to all lithium transition metal phosphates like $Li_{0.9+x}Fe_{1-y}Mg_y(PO_4)$ $Li_{0.9+x}Fe_{1-y}Nb_y(PO_4)$, $Li_{0.9+x}Fe_{1-y}Co_y(PO_4)$ $Li_{0.9+x}Fe_{1-y}Zn_y(PO_4)$ $Li_{0.9+x}Fe_{1-y}Al_y(PO_4)$, $Li_{0.9+x}Fe_{1-y}(Zn, Mg)_y(PO_4)$, $Li_{0.9+x}Fe_{1-y}Mn_y(PO_4)$ as well.

The term "hydrothermal synthesis or conditions" means for the purpose of the present invention temperatures of 100° C. to 200° C., preferably 100° C. to 170° C. and quite particularly preferably 120° C. to 170° C. as well as a pressure of 1 bar to 40 bar vapour pressure. In particular, it has surprisingly been shown that the synthesis at the quite particularly preferred temperature of 120-170° C., in particular at 160±5° C., leads to an increase in the specific capacity of the thus-obtained $Li_{0.9+x}Fe_{1-y}M_y(PO_4)$ according to the invention compared with reaction at more than 160° C.±5° C.

The intermediate product is typically obtained in the form of a wet filter cake before preparing an aqueous suspension according to process step b).

3. Synthesis of the Lithium Transition Metal Phosphates in the Form of Secondary Agglomerates Example 1: Preparation of Carbon Coated $LiFePO_4$ Secondary Agglomerates The wet filter cake consisting essentially of carbon coated $LiFePO_4$ primary particles (C-LFP) typically in form of needles and platelets is mixed with 10 mass-% of lactose (based on the solid lithium iron phosphate). A suspension with 52.5% solid content is prepared with distilled water to maximize the efficiency of the following milling step.

The suspension is then continuously milled with a ball mill with grinding beads having a diameter of 90-110 μm. The grinding beads consist of a stabilized zirconium oxide ceramic. The milling reactor was cladded with silicon carbide to avoid a contamination of the product and to allow an effective cooling.

The energy introduced into the suspension is removed by cooling the suspension, wherein the main amount of the heat is directly removed by the mill.

The mechanical energy applied to the suspension was 1200 kWh/t. During milling a total of 1.5 mass-% of citric acid (based on the solid lithium iron phosphate) were added.

After milling the suspension was spray-dried via a pneumatic nozzle. The solid content of the suspension was 52.5%.

During spray-drying the gas inlet temperature was 300° C., the outlet temperature was 105° C.

The separation of the solid product from the gas was carried out in a bag filter. The dried agglomerate was further pyrolized in inert gas atmosphere at 750° C. in a rotary kiln.

The product obtained had a bulk density of 1030 g/l, the tap density was 1480 g/l and the press density 2230 g/l.

SEM images were recorded of the so obtained product (see FIGS. 3 and 4).

The characteristics of this product were:

| Term | Measured | Unit | Method |
| --- | --- | --- | --- |
| Crystal structure Olivine $LiFePO_4$ | >95% | N/A | XRD |
| Carbon-content | 1.9 | wt % | C/S-Analyzer |
| Mean particle size primary particles | 71 | nm | SEM |
| PSD ($d_{10}$) | 4.7 | µm | Laser Diffraction (Malvern) |
| PSD ($d_{50}$) | 15.9 | µm | Laser Diffraction (Malvern) |
| PSD ($d_{90}$) | 36.4 | µm | Laser Diffraction (Malvern) |
| Specific surface area | 19 | $m^2/g$ | Nitrogen adsorption (BET) |
| Bulk Density | 1030 | g/l | |
| Tap density | 1480 | g/l | Automatic tap density analyzer |
| Volume Resistivity | 13.9 | Ωcm | Powder Resistivity Analyzer |
| Press Density | 2.23 | $g/cm^3$ | Powder Resistivity Analyzer |
| pH value | 9.5 | | pH electrode |
| Spec. Capacity | 158.4 | mAh/g | $C-LiFePO_4/LiPF_6$-EC-DMC/$Li^0$ Charge/Discharge at C/10, 25° C. Range: 4.0 V-2.0 V |

Example 2: Preparation of $C-LiMnPO_4$ Secondary Agglomerates

The synthesis was carried out as in example 1. Instead of $LiFePO_4$, $LiMnPO_4$ was used.

The product obtained had a bulk density of 1030 g/l, the tap density was 1400 g/l and the press density 2190 g/l. The BET-surface was 24 $m^2/g$. The characteristics of this product were:

| Term | Measured | Unit | Method |
| --- | --- | --- | --- |
| Carbon-content | 2.2 | wt % | C/S-Analyzer |
| Mean particle size Primary particles | 85 | nm | SEM |
| PSD ($d_{10}$) | 3.6 | µm | Laser Diffraction (Malvern) |
| PSD ($d_{50}$) | 14.9 | µm | Laser Diffraction (Malvern) |
| PSD ($d_{90}$) | 30.5 | µm | Laser Diffraction (Malvern) |
| Specific surface area | 24 | $m^2/g$ | Nitrogen adsorption (BET) |
| Bulk Density | 1030 | g/l | |
| Tap Density | 1400 | g/l | Automatic tap density analyzer |
| Volume Resistivity | 25 | Ωcm | Powder Resistivity Analyzer |
| Press Density | 2.19 | $g/cm^3$ | Powder Resistivity Analyzer |
| pH value | 8.8 | | pH electrode |
| Spec. Capacity | 150 | mAh/g | $C-LiMnPO_4/LiPF_6$-EC-DMC/$Li^0$ Charge/Discharge at C/10, 25° C. Range: 4.3 V-2.0 V |

Example 3: Preparation of $C-LiCoPO_4$ Secondary Agglomerates

The synthesis was carried out as in example 1. Instead of $LiFePO_4$, $LiCoPO_4$ was used.

The product obtained had a bulk density of 1050 g/l, the tap density was 1390 g/l and the press density 2180 g/l. The BET-surface was 25 $m^2/g$. The characteristics of this product were:

| Term | Measured | Unit | Method |
| --- | --- | --- | --- |
| Carbon-content | 2.0 | wt % | C/S-Analyzer |
| Mean particle size Primary particles | 81 | nm | SEM |
| PSD ($d_{10}$) | 3.9 | µm | Laser Diffraction (Malvern) |
| PSD ($d_{50}$) | 15.1 | µm | Laser Diffraction (Malvern) |
| PSD ($d_{90}$) | 33.8 | µm | Laser Diffraction (Malvern) |
| Specific surface area | 25 | $m^2/g$ | Nitrogen adsorption (BET) |
| Bulk Density | 1050 | g/l | |
| Tap Density | 1390 | g/l | Automatic tap density analyzer |
| Volume Resistivity | 26 | Ωcm | Powder Resistivity Analyzer |
| Press Density | 2.18 | $g/cm^3$ | Powder Resistivity Analyzer |
| pH value | 9.1 | | pH electrode |
| Spec. Capacity | 150 | mAh/g | $C-LiCoPO_4/LiPF_6$-EC-DMC/$Li^0$ Charge/Discharge at C/10, 25° C. Range: 5.2 V-3.0 V |

Example 4: Preparation of $C-LiMn_{0.67}Fe_{0.33}PO_4$ Secondary Agglomerates

The synthesis was carried out as in example 1. Instead of $LiFePO_4$, $LiMn_{0.67}Fe_{0.33}PO_4$ was used.

The product obtained had a bulk density of 1020 g/l, the tap density was 1430 g/l and the press density 2210 g/l. The BET-surface was 27 $m^2/g$. The characteristics of this product were:

| Term | Measured | Unit | Method |
| --- | --- | --- | --- |
| Carbon-content | 2.3 | wt % | C/S-Analyzer |
| Mean primary particle size | 70 | nm | SEM |
| PSD ($d_{10}$) | 2.5 | µm | Laser Diffraction (Malvern) |
| PSD ($d_{50}$) | 13.8 | µm | Laser Diffraction (Malvern) |
| PSD ($d_{90}$) | 31.8 | µm | Laser Diffraction (Malvern) |
| Specific surface area | 27 | $m^2/g$ | Nitrogen adsorption (BET) |
| Bulk Density | 1020 | g/l | |
| Tap Density | 1430 | g/l | Automatic tap density analyzer |
| Volume Resistivity | 18 | Ωcm | Powder Resistivity Analyzer |
| Press Density | 2.21 | $g/cm^3$ | Powder Resistivity Analyzer |
| pH value | 8.7 | | pH electrode |

-continued

| Term | Measured | Unit | Method |
| --- | --- | --- | --- |
| Spec. Capacity | 151 | mAh/g | $C-LiMn_{0.67}Fe_{0.33}PO_4/LiPF_6-$EC-DMC/$Li^0$ Charge/Discharge at C/10, 25° C. Range: 4.3 V-2.0 V |

4. Preparation Electrodes:

Electrodes were prepared by mixing 90 parts per weight of lithium-transition-metal-phosphate of the invention or carbon coated lithium-transition-metal-phosphate together with 5 parts of carbon. 5 parts of a binder were diluted in N-methyl-2-pyrrolidon solution and added to the mixture. The mixture was kneaded to give a slurry. The slurry was applied by a doctoral blade to an aluminium collector foil serving as a collector. The film was dried at 60° C. under reduced pressure of 500 mbar for 2 h.

A platen press was used for densification. But any other press like for example a calander press is suitable as well. The pressing force was in the range of from 500 to 10000 N/cm$^2$, preferably 5000 to 8000 N/cm$^2$. The target value for the coating (active material) packing density was >1.5 g/cm$^3$ or higher, more preferably >1.9 g/cm$^3$.

The electrodes were dried for 2 more hours under vacuum, preferably at elevated temperatures of about 100° C. Cells were assembled as "coffee bag" cells (batteries), which consist of an aluminium coated polyethylene bag. Lithium metal was used as the counter electrode. 1M $LiPF_6$ was used as electrolyte in a 1:1 mixture of ethylenecarbonate (EC):diethylenecarbonate (DEC). In each battery one layer of a microporous polypropylene-foil (Celgard 2500; Celgard 2500 is a trademark) having lithium ion permeability was used as the separator. The bags were sealed using a vacuum-sealing machine.

Measurements were performed in a temperature-controlled cabinet at 20° C. using a Basytec cell test system (CTS). Voltage range for cycling was between 2.0V and 4.0V for pure $LiFePO_4$. For other cathode materials the voltage had to be adjusted according to the voltage profile of the system, e.g. for $LiFe_{0.33}Mn_{0.67}PO_4$ between 4.3 and 2.0 V.

Figure 3:
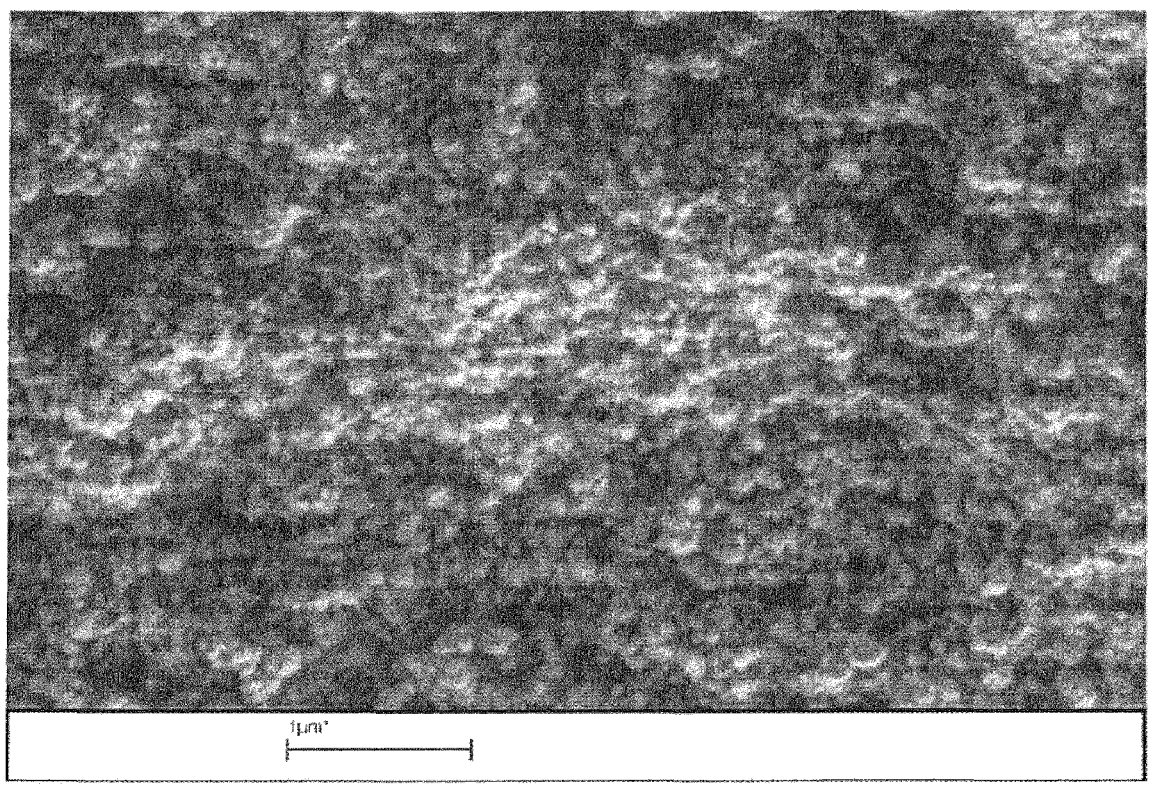
Figure 4:
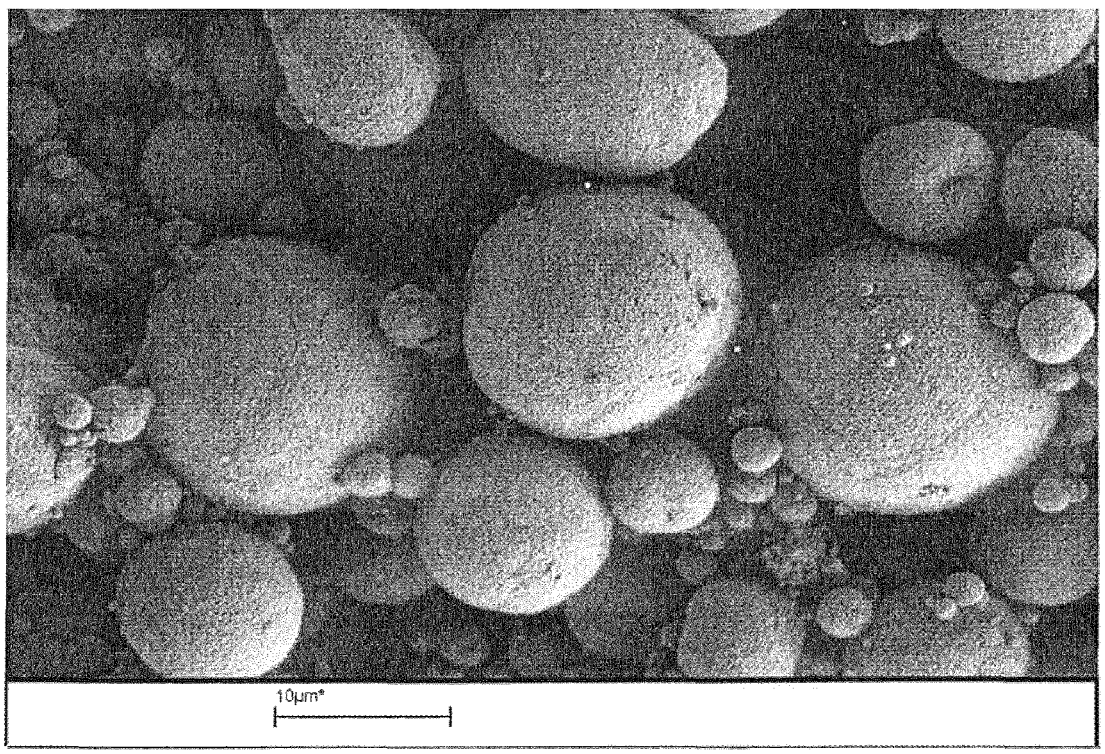

FIG. 3 is a SEM image of the primary particles of the secondary agglomerates of C—$LiFePO_4$ of the invention milled with 1200 kWh/t and FIG. 4 is a SEM image of the secondary agglomerates of C—$LiFePO_4$ of the invention milled with 1200 kWh/t. The differences in particle size and morphology are clearly visible. The properties with respect to density are described above.

FIG. 4 shows C—$LiFePO_4$ agglomerates according to the invention (example 1) with mean particle sizes of 10-20 μm ($d_{50}$=15.9), having a higher density, better flowability and less dusting than the powders of the prior art as can be seen from the figures and their homogeneous particle morphology.

Figure 1:
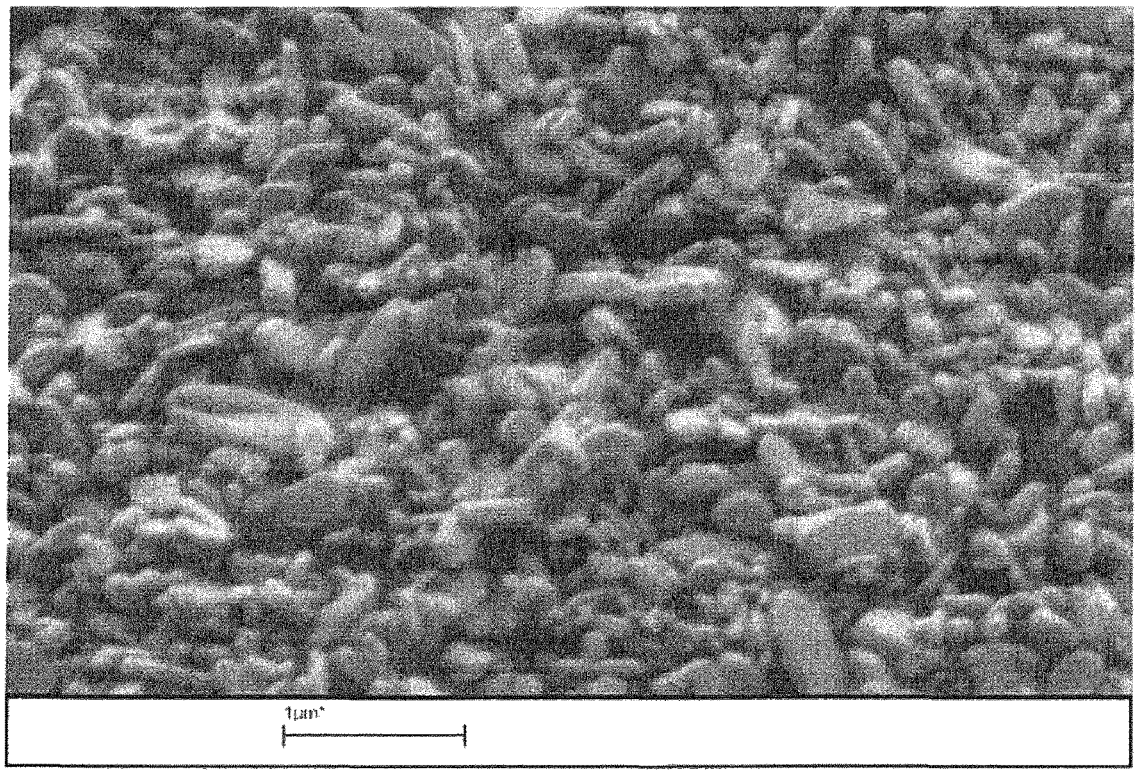
FIG. 1 is a SEM image of primary particles of unmilled C—$LiFePO_4$ of prior art obtained by a hydrothermal method (WO 2005/051840 A1. The platelet shape of the fine crystals can be seen.
Figure 2:
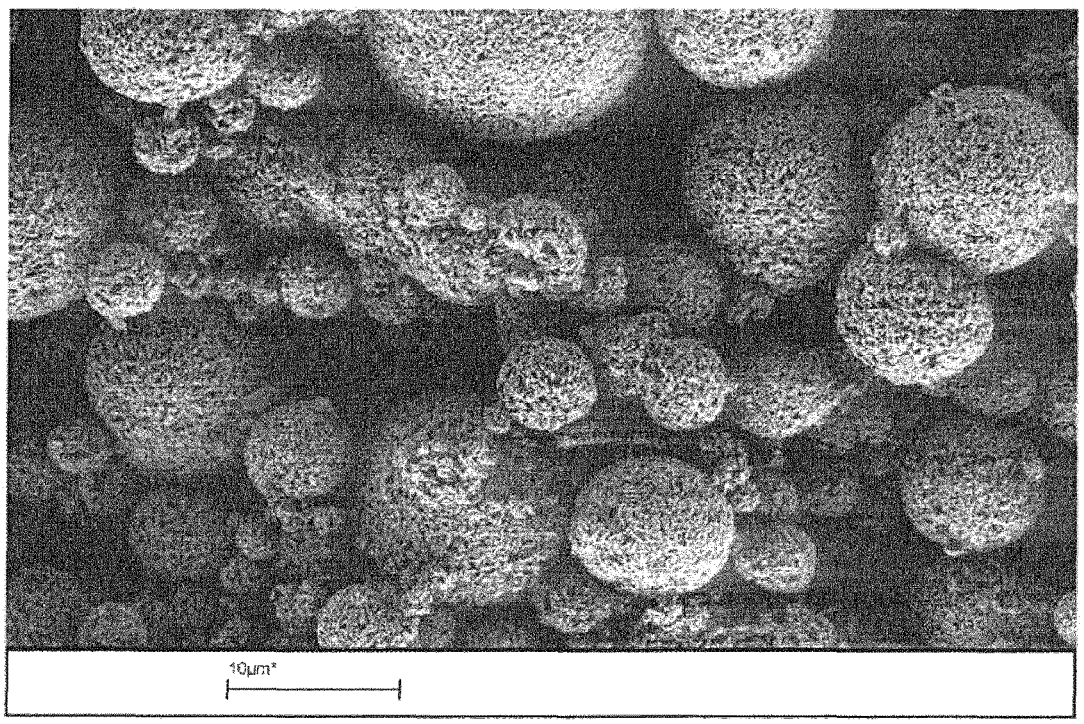
FIG. 2 is a SEM image of secondary agglomerates of unmilled C—$LiFePO_4$ obtained by spray drying without a milling step, i.e. secondary agglomerates obtained from the primary particles as shown in FIG. 1. The irregular shape is clearly visible.
Figure 5:
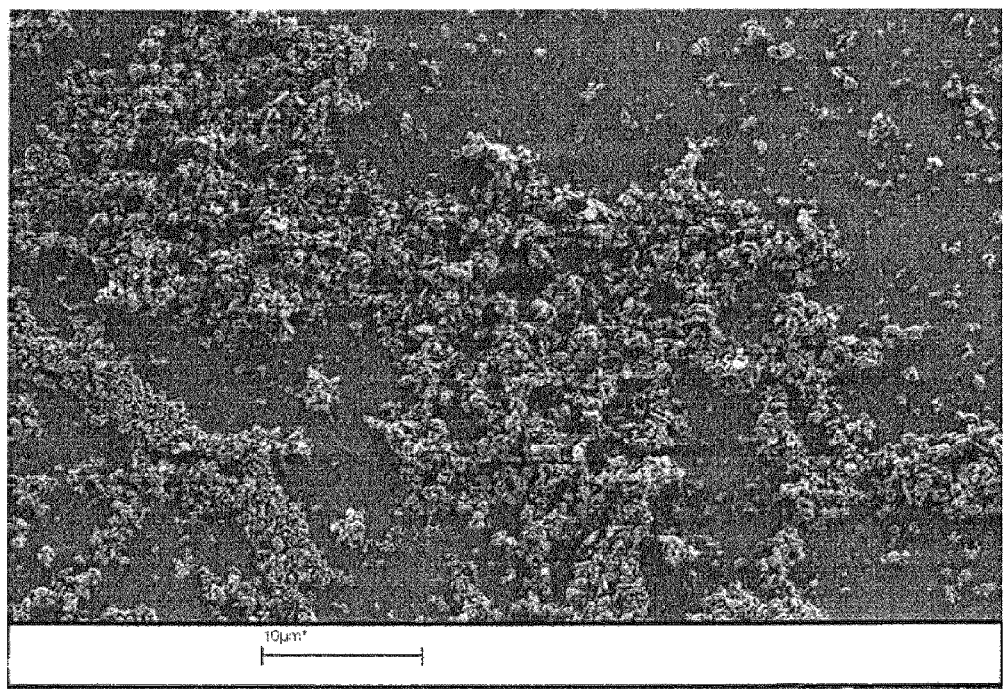

FIG. 5 shows primary particles of C—$LiFePO_4$ according to the invention. In comparison to FIG. 1 it is clearly visible that the primary particles of C—$LiFePO_4$ agglomerates of the prior art are much coarser.

Figure 6:
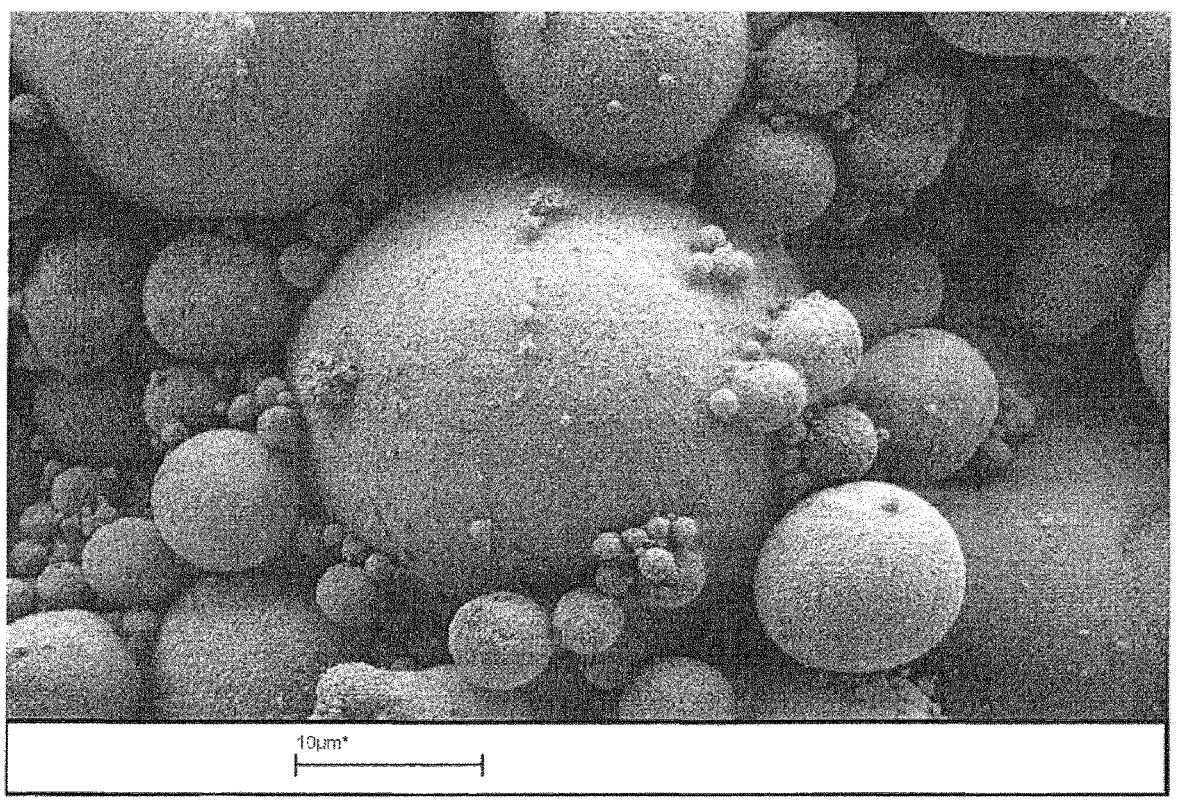

FIG. 6 shows another SEM photograph of secondary particles of C—$LiFePO_4$ according to the invention. The secondary particle size of 15-20 μm facilitates the electrode processability, namely enables that a homogeneous dispersion of the particles of the active material/conductive agent/binder within the electrode can be obtained. With active material of the prior art, either in agglomerate or powder form inhomogeneities are observed which deteriorate the cycling characteristics and the capacity of the electrode. Further uncontrolled formation of locally "concentrated" agglomerates of active material is avoided. Thus an electrode according to the invention shows a higher capacity and conductivity than electrodes with active material of the prior art. The agglomerates according to the invention are more stable towards external pressure than agglomerates of prior art. It was observed that during processing of the electrode formulation (preparation of a dispersion and applying to an electrode substrate) 95% of the agglomerates according to the invention remained intact, whereas the more brittle agglomerates of the prior art remained only to 50% intact.

Figure 7:
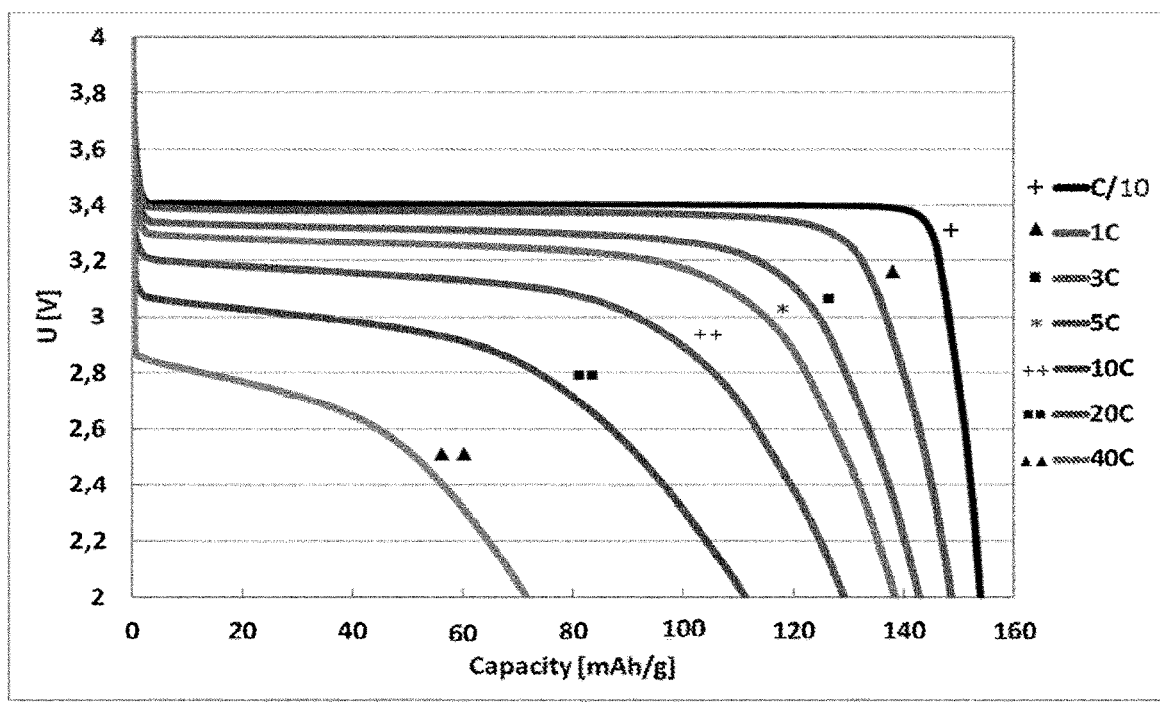

FIG. 7 above shows the capacity of an electrode with carbon coated $LiFePO_4$ (C-LFP) according to the invention made in accordance with example 1 as active material, indicating excellent cycling characteristics. The electrode formulation was 90/5/5 weight parts C—$LiFePO_4$ (carbon coated $LiFePO_4$)/Super P Li carbon/Binder PVDF 21216. The electrode density was 1.7 g/cm$^3$, the loading was 4.35 mg/cm$^2$.

Figure 8A:
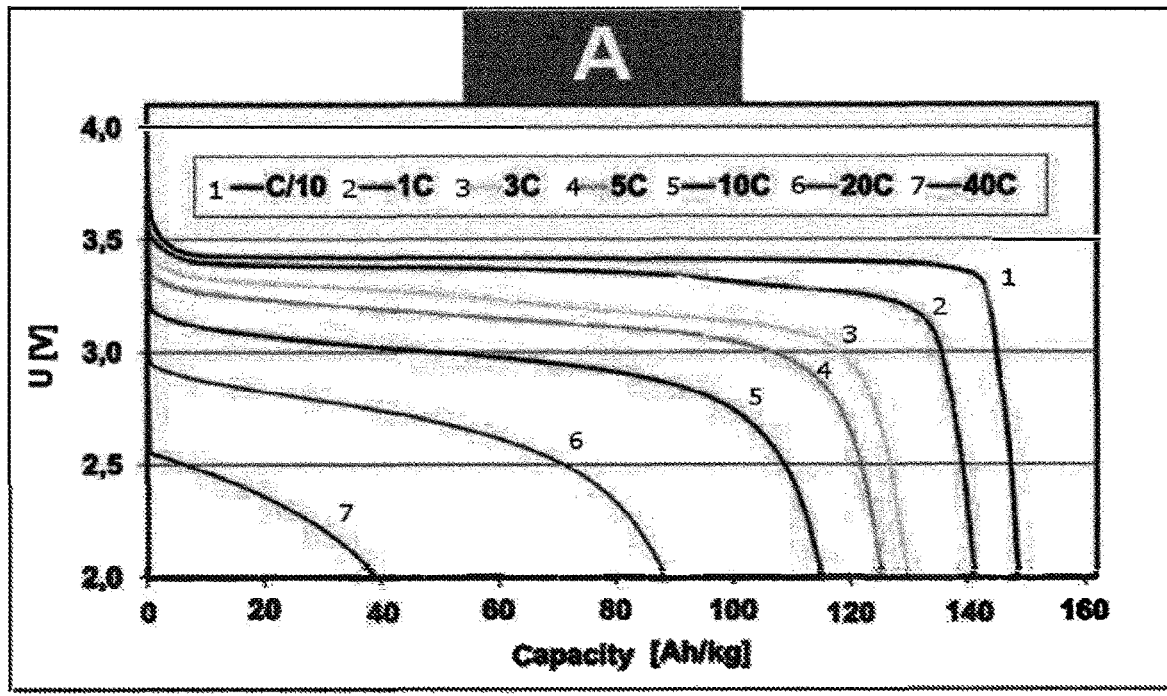
Figure 8B:
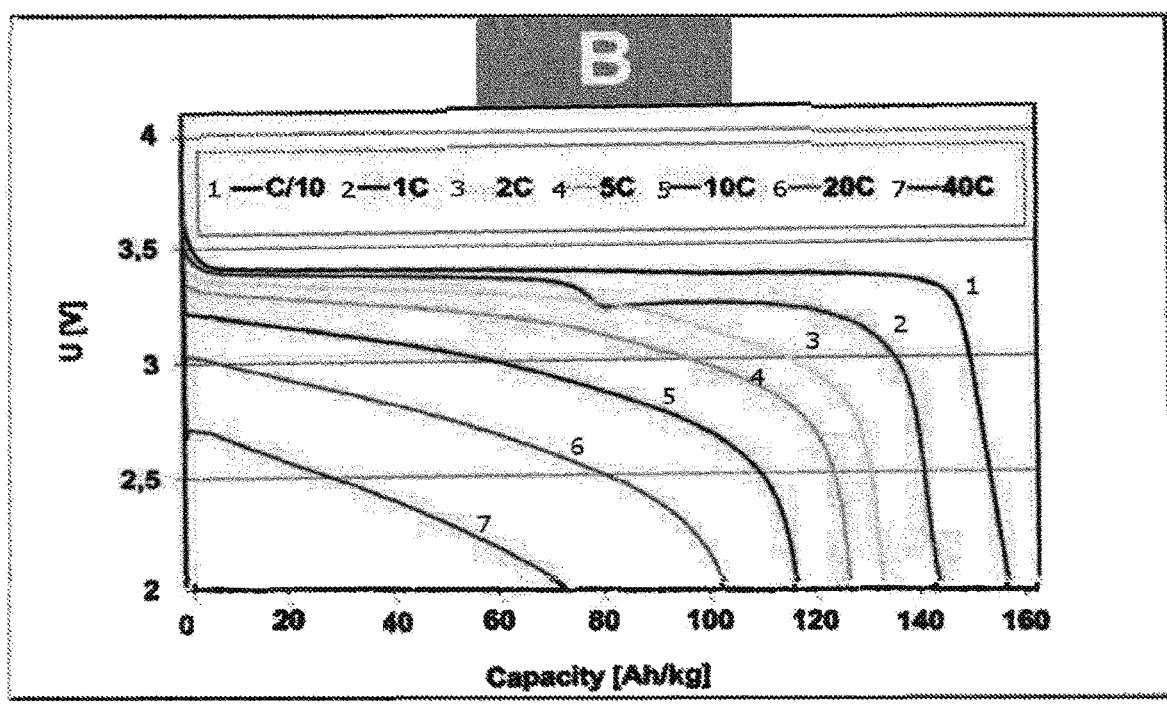

FIG. 8 shows the capacity upon cycling of prior art carbon coated $LiFePO_4$ agglomerates of three different sources. The electrode formulation was 90/5/5 weight parts C—$LiFePO_4$/Super P Li carbon/Binder PVDF 21216. The electrodes were prepared as described in the foregoing and FIG. 7.

As can be seen compared to FIG. 7 and table 1, all prior art material showed inferior electrochemical properties.

FIG. 9 shows the capacity upon cycling of carbon coated $LiFePO_4$ agglomerates of prior art (LFP-prior art) obtained according to the combined teachings of WO 2005/051840 A1 and US 2010/0233540 (see below)(unmilled). Also here, the electrochemical properties of C—$LiFePO_4$ according to the invention proved to be superior (see in FIG. 7 and table 1). The material of sources A, B, C were obtained from Hanwha Chemicals (C-LFP: grade LFP-1000) (source B), VSPC Co. Ltd. (C-LFP, grade: generation 3) (source C) or were made according to US 2010/0233540 (C-LFP, source A). The Agglomerates C-LFP Prior Art were obtained by synthesizing LFP primary particles according to WO 2005/051840 A1 followed by spray drying according to the process described in US 2010/0233540.

The following summarizes the electric properties of the materials in FIGS. 7-9. It can be seen that C-LFP according to the invention is better than the prior art materials A, B and C and C-LFP agglomerates prior art and has better processability with a better flowability and less dusting and more homogeneous distribution in the electrode formulation.

TABLE 1

Electric properties of material according to the invention and of prior art

|  | Discharge Rate | Unit | Agglomerates of source A | Agglomerates of source B | Agglomerates of source C | C-LFP Agglomerates prior art | C-LFP invention |
|---|---|---|---|---|---|---|---|
| Capacity | C/10 | mAh/g | 148.5 | 156.4 | 150.4 | 153.4 | 158.4 |
|  | 1 C | mAh/g | 141.2 | 143.1 | 139.4 | 144.2 | 153.3 |
|  | 3 C | mAh/g | 129.8 | 132.6 | 127.4 | 134.0 | 145.5 |
|  | 5 C | mAh/g | 125.4 | 126.2 | 119.6 | 127.4 | 140.1 |
|  | 10 C | mAh/g | 115.0 | 116.1 | 105.7 | 114.0 | 128.6 |
| Volumetric Energy Density | C/10 | mWh/cm$^3$ | 998 | 898 | 923 | 960 | 1048 |
|  | 1 C | mWh/cm$^3$ | 926 | 804 | 836 | 875 | 1000 |
|  | 3 C | mWh/cm$^3$ | 816 | 729 | 742 | 781 | 924 |
|  | 5 C | mWh/cm$^3$ | 770 | 675 | 679 | 719 | 870 |
|  | 10 C | mWh/cm$^3$ | 666 | 587 | 574 | 605 | 760 |
|  | Press Density | kg/m$^3$ | 2030 | 1810 | 2000 | 1915 | 2060 |
| PSD | d10 | μm | 7.8 | 0.92 | 5.8 | 4.5 | 4.7 |
|  | d50 | μm | 25.4 | 6.1 | 15.0 | 14.8 | 15.9 |
|  | d90 | μm | 58.0 | 17.1 | 28.0 | 30.8 | 36.4 |

The invention claimed is:

1. A lithium-transition-metal-phosphate compound of formula $Li_{0.9+x}Fe_{1-y}M_y(PO_4)$ with $x \leq 0.3$ and $0 \leq y \leq 1$ and M is a metal or semimetal or mixtures thereof in the form of secondary particles made of agglomerates of spherical primary particles,
   wherein the primary particles have a size in the range of 0.02-2 μm and
   the secondary particles have a mean size ($d_{50}$) of 5-40 μm and a BET surface of 16-40 m$^2$/g and
   wherein the lithium-transition-metal-phosphate compound has a tap density of 1250-1600 g/l.

2. A lithium-transition-metal-phosphate compound of formula $Li_{0.9+x}Fe_{1-y}M_y(PO_4)$ with $x \leq 0.3$ and $0 \leq y \leq 1$ and M is a metal or semimetal or mixtures thereof in the form of secondary particles made of agglomerates of spherical primary particles,
   wherein the primary particles have a size in the range of 0.02-2 μm,
   wherein the secondary particles have a mean size ($d_{50}$) of 5-40 μm and a BET surface of 16-40 m$^2$/g,
   wherein the lithium-transition-metal-phosphate compound has a tap density of 1250-1600 g/l and,
   wherein the lithium-transition-metal phosphate compound has a bulk porosity of 65-80%.

3. The lithium-transition-metal-phosphate compound according to claim 1 with a tap porosity of 55-65%.

4. The lithium-transition-metal-phosphate compound according to claim 1 with a bulk density of 750-1250 g/l.

5. The lithium-transition-metal-phosphate compound according to claim 1 with a press density of 2000-2800 g/l.

6. The lithium-transition-metal-phosphate compound according to claim 1 which is LiFePO$_4$, LiMnPO$_4$ or $Li_{0.9+x}Fe_{1-y}Mn_yPO_4$.

7. The lithium-transition-metal-phosphate compound according to claim 1, wherein the primary particles have a conductive carbon deposit on at least a part of the surface of the primary particles.

8. The lithium-transition-metal-phosphate compound according to claim 2 with a tap porosity of 55-65%.

9. The lithium-transition-metal-phosphate compound according to claim 2 which is LiFePO$_4$, LiMnPO$_4$ or $Li_{0.9+x}Fe_{1-y}Mn_yPO_4$.

10. The lithium-transition-metal-phosphate compound according to claim 2, wherein the primary particles have a conductive carbon deposit on at least a part of the surface of the primary particles.

* * * * *